Feb. 7, 1956
M. J. PURETIC
2,733,531
NET HANDLING APPARATUS
Filed July 1, 1955
2 Sheets-Sheet 1
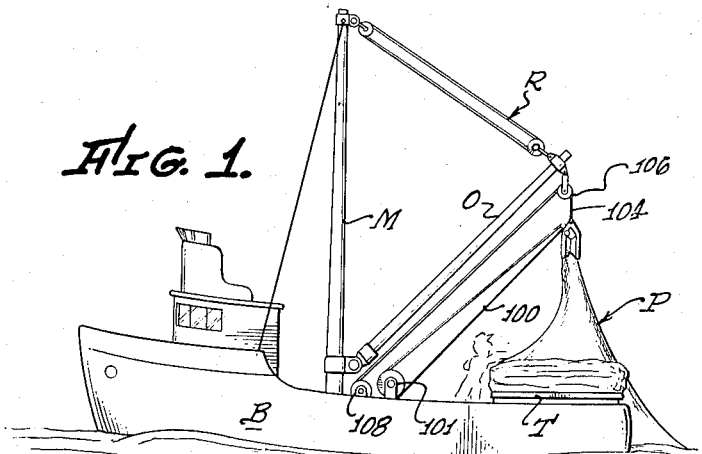
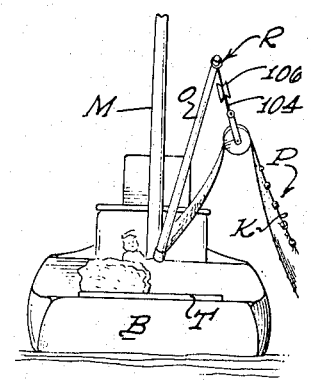
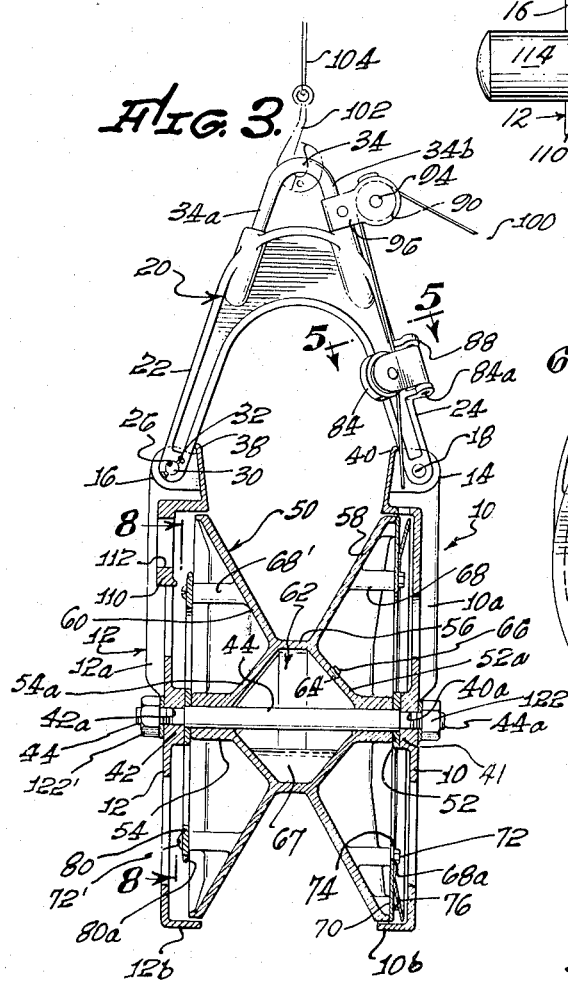
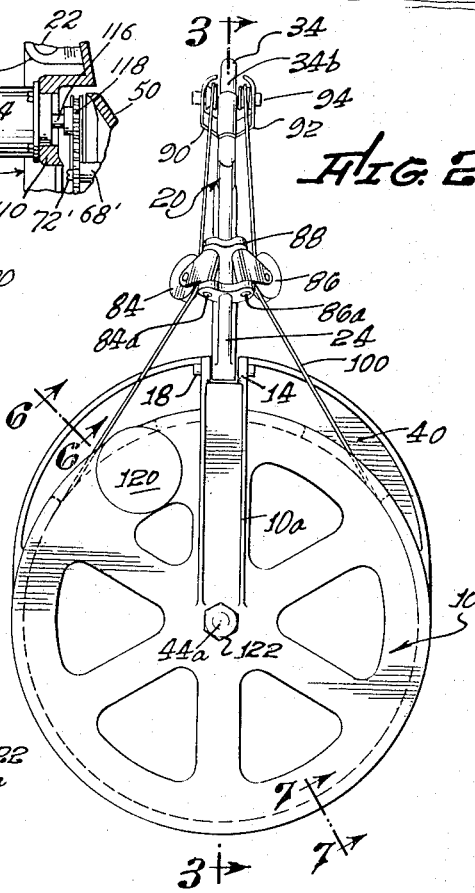
INVENTOR.
MARIO J. PURETIC,
BY
William C. Babcock
ATTORNEY.

Feb. 7, 1956  M. J. PURETIC  2,733,531
NET HANDLING APPARATUS
Filed July 1, 1955  2 Sheets-Sheet 2
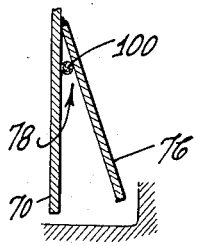
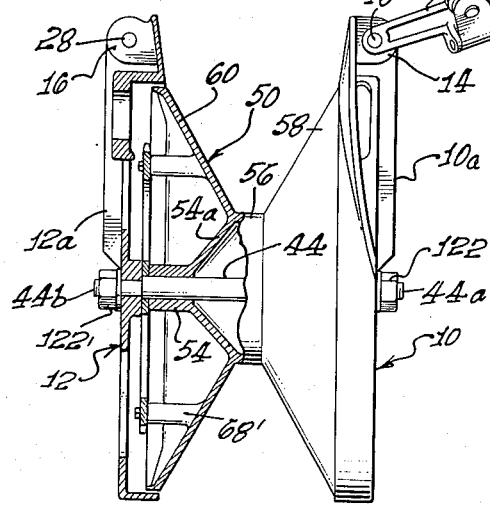
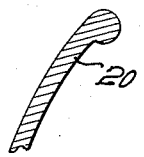
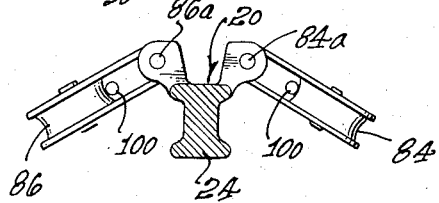
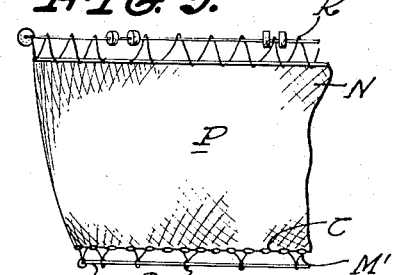
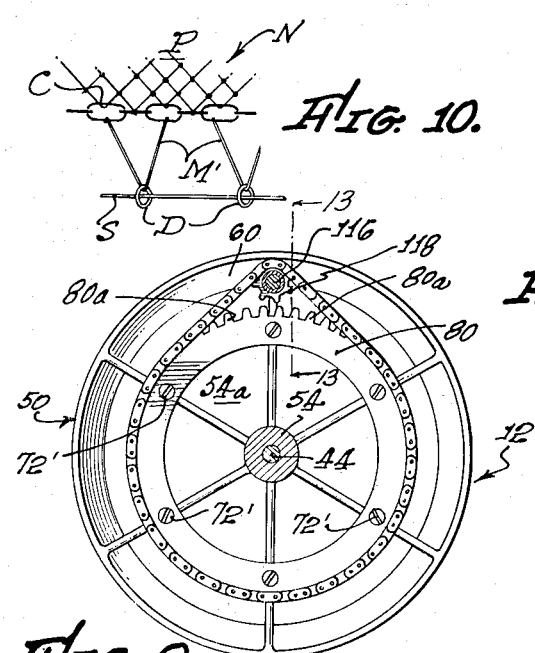
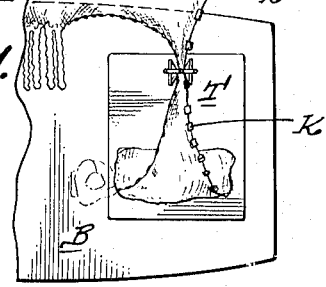
INVENTOR.
MARIO J. PURETIC,
BY
William C. Babcock
ATTORNEY.

United States Patent Office 2,733,531
Patented Feb. 7, 1956

2,733,531
NET HANDLING APPARATUS
Mario J. Puretic, Torrance, Calif.

Application July 1, 1955, Serial No. 519,567

8 Claims. (Cl. 43—8)

The present invention relates generally to the field of commercial fishing, and more specifically to an improvement in a power-operated device, which device and method of using same are disclosed in co-pending application for United States Letters Patent, Serial No. 450,094, filed August 16, 1954, orginally entitled Purse Seine Power Block Unit and Method of Operating Same, and wherein the method of using the device is claimed.

A major object of the present invention is to provide a power-operated device which when mounted in an elevated position above an area in which a net is to be stacked, permits a net to be moved upwardly by force exerted on a confined portion thereof, which net after passing through the device, depends downwardly therefrom in such a manner as to be guidable into the desired configuration in the area as it is delivered thereto.

Another object of the invention is to supply a device that permits power handling of a net that includes cork and lead or chain lines, minimizes both the time and physical effort required in handling a net, reduces the possibility of the net being torn or damaged during the moving thereof, and permits any damaged or torn net portions to be positioned outwardly from the main body thereof for future repair, as the net is lowered during the stacking operation.

A further object of the invention is to provide a power actuated mechanism which first guides a portion of the net into a confined space before force is applied thereto, which force when applied is continuous and uniformly distributed over the entire confined portion of the net to minimize stress and strain on the individual lines, cords, or elongate members forming same.

Yet another object of the invention is to supply a compact, movable device of extremely simple and rugged construction that is adapted to be readily mounted in a suitable elevated position for use thereof, and which permits efficient moving of nets and stacking of same with a minmum of personnel.

A still further object of the invention is to provide a net-moving device that can be employed aboard a commercial fishing vessel without appreciably altering accepted fishing techniques, does not require specially trained labor for its successful operation, and is capable of handling nets to which buoys are affixed.

Yet another object of the invention is to provide a device that can be driven by power means normally employed aboard a fishing vessel, or by a power unit that can be affixed to the invention as an integral part thereof.

A still further object of the invention is to supply a power-operated unit that is so movably supported in an elevated position that it can be easily oriented in a direction to accommodate the net that is to be drawn upwardly and deposited in a predetermined area for stacking, which unit due to this mounting, is capable of moving outwardly toward the net and moved at an angle with the horizontal to achieve maximum area contact between the driven rotating portion of the device and the net to minimize slippage, as well as the per unit stress to which that net portion in contact with the rotating portion of the invention is subjected in passing thereover.

Still another object of the invention is to provide a power block particularly adapted for being driven by a cable, and one that operates equally satisfactorily whether wet or dry.

These and other objects and advantages of the invention will become apparent from the following description of a preferred form thereof, and from the drawings illustrating that form in which:

Figure 1 is an elevational view of a conventional purse seiner showing the present invention removably mounted on the boom thereof;

Figure 2 is a side elevational view of the device in an operative position;

Figure 3 is a cross-sectional view of the device taken on line 3—3 of Figure 2;

Figure 4 is the same view of the device as shown in Figure 3, but with a portion thereof shown in elevation showing the supporting yoke in the open position;

Figure 5 is a fragmentary horizontal cross-sectional view of the invention taken on line 5—5 of Figure 3;

Figure 6 is a fragmentary vertical cross-sectional view of the guide portion of the device taken on line 6—6 of Figure 2;

Figure 7 is a fragmentary vertical cross-sectional view of the cable drive utilized in rotating the preferred form of the invention;

Figure 8 is a side elevational view of an alternate form of the invention;

Figure 9 is a fragmentary elevational view of a purse seine showing the manner in which it floats in a fish gathering position;

Figure 10 is a fragmentary, elevational, enlarged view of a lower portion of a seine;

Figure 11 is a fragmentary plan view of the stern of the boat shown in Figure 1;

Figure 12 is an end elevational view of the boat shown in Figure 1; and

Figure 13 is a vertical section taken on line 13—13 of Figure 8, this view corresponding to the left central portion of Figure 3 of the other embodiment of the invention.

Referring now to Figures 1, 11 and 12 of the drawings for the general arrangement of the invention, it will be seen that the conventional purse seiner B illustrated therein is provided with a mast M and a boom O pivotally supported from the mast. Boom O is adapted to be positioned at the desired angle relative to the mast by conventional rigging R.

In Figures 1, 11 and 12, the invention is shown removably supported on the upper extremity of boom O, in which position it is adapted to haul a purse seine P (Figures 1 and 12) aboard the boat B. As is common practice in commercial fishing, as the set is drawn aboard, it is deposited onto a turntable T normally located in the stern of the vessel. The purse seine P, of which there are a number of types, in general comprises an elongate net or webbing of uniform mesh size and usually range from 1500 to 3000 feet in length. After circling of the vessel, the seine is set to catch fish between two free end portions thereof which are pulled together by means of a drawstring whereby the net extends outwardly in a looped fashion, as shown in Figure 11. When so disposed, the seine sinks below the water surface due to a chain or lead line C affixed to the lower edge of the net from which a number of longitudinally spaced bridle rings D are supported by flexible, downwardly depending members M', as best seen in Figure 9. A purse cable S anchored to the boat is threaded through rings D. A cork line K is provided on the upper edge of the net N comprising the main body of the seine. Due to the natural characteristics thereof this cork line floats on the surface of the water and maintains the top portion of the net in the above-described position. Before the purse seine is set, it is supported on the turntable T, and as the boat B travels in an arcuate path, the seine is payed out into the water. When all of the seine is placed in the water it is supported therein with the webbing hanging nearly straight down between the cork and lead lines in the form of a large loop.

After the looped net surrounds a school of fish the net is pursed by pulling the purse cable S whereby the bottom of the net below the lead line, or the lower edge portions thereof, are puckered to close the net and retain the catch therein. The lead line C or chain, as the case may be, is stacked or coiled on the deck as the lower portion of the seine is closed. When the seine P is fully pursed, it may then be drawn toward the boat B by means of the present invention, the detailed construction of which is shown in Figures 1 and 2. The invention is preferably disposed on its side on the boat deck in such a position to permit engagement of the seine thereby. After such engagement, the invention is hoisted to an elevated position, preferably on the outer end of boom O, above the center point of the turntable T. Upon actuation in this position, the invention draws the cork-line K and the seine from the sea and the lead line from the deck to deposit same on the center of the turntable T where it may be easily caused to fall in the desired stacking arrangement.

In detail, the invention comprises two laterally spaced annular side plates 10 and 12 that have upwardly extending ribs 10a and 12a respectively formed on the outer surfaces thereof. Ribs 10a and 12a are provided with portions 14 and 16 that extend upwardly above the side plates 10 and 12, as shown in Figure 3. Rib 10a has a bore formed therein that is engaged by a pin 18, which pin serves to pivotally support a yoke denoted generally by the numeral 20. The yoke includes two downwardly extending arms 22 and 24, with arm 22 having a bore 26 formed therein (Figure 4). A bore 28 is formed in rib portion 16. A pin or bolt 30 is provided which is of such dimensions as to permit slidable insertion thereof within the confines of bores 26 and 28 whereby the invention is held together as an integral unit as seen in Figure 3. Displacement of bolt 30 from bores 26 and 28 is prevented by means of cotter keys 32 or other suitable securing means.

A heavy rod is bent or otherwise formed into the general shape of yoke 20 but is considerably smaller in dimension and provides an eye 34 by which the invention may be supported when legs 34a and 34b of the eye are rigidly secured to the upper portion of the yoke as shown. In Figures 2 and 3 it will be seen that ribs 10a, 12a and side plates 10, 12 serve as mountings for two inverted crescent-shaped net guides 38, 40 that are situated adjacent pins 18 and 30. Bosses 41, 42 are formed in the center of side plates 10 and 12 respectively. Bosses 41, 42 have bores 40a, 42a extending therethrough, which bores are engaged by the recessed ends 44a, 44b of a heavy, rigid shaft 44.

A spool or drum 50 is rotatably mounted on the shaft 44. Spool 50 includes two laterally separated hubs 52 and 54 having annular side walls 52a and 54a formed on the inner ends thereof. The inwardly disposed circumferential edges of side walls 52a and 54a are connected by a cylindrical web 56. Two ring-shaped flanges 58 and 60 extend upwardly and outwardly in opposite directions from web 56 at the junction thereof with side walls 52a and 54a. Web 56 and side walls 52a, 54a cooperatively define an enclosed receptacle 62 communicating with the two hubs 52 and 54. Side wall 52a has a tapped bore 64 formed therein that is normally closed by a threaded plug 66. Receptacle 62 serves to hold oil or other suitable lubricant 67 splashed or otherwise fed into the space between hubs 52, 54 and shaft 44 during rotation of the spool.

A number of parallel spaced bosses 68 extend outwardly from flange 58, which bosses terminate in flat faces 68a in substantially the same plane as the outer circumferential edge of flange 58. Bosses 68 have tapped bores extending inwardly from the faces 68a thereof. A circular rigid plate 70 is provided that has bores formed therein that are in alignment with bores formed in bosses 68. Plate 70 is rigidly held in place on bosses 68 and parallel to side plate 10 by bolts 72 that extend through the bores formed in the plate to engage the tapped bores in the bosses. Plate 70 is formed with a central bore 74 through which shaft 44 is disposed between hub 52 and boss 40, as shown in Figure 3. A ring-shaped member 76 is welded or otherwise affixed to the exterior surface of plate 70 at a wedging angle relative thereto (Figure 7). The ring-shaped member 76 and plate 70 cooperatively provide a cable drive 78 for spool 50 as will be explained in detail hereinafter.

A plurality of bosses 68' extend outwardly from flange 60 and are structurally identical to bosses 68. A gear 80 fabricated from steel plate is rigidly supported on bosses 68' in the same manner as plate 70. Gear 80 is of such diameter that the teeth 80a thereof are positioned inwardly a considerable distance from the outer circumferential edge of flange 50.

Two identical pulleys 84 and 86 pivotally supported by vertically extending pins 84a and 86a are provided on opposite sides of yoke arm 24. Pins 84a and 86a are mounted in a bracket 88 that is welded or otherwise secured to arm 24. Two laterally separated, parallel pulleys 90 and 92 in alignment with pulleys 84 and 86 respectively, are rotatably mounted on a shaft 94 that is secured to yoke arm 24 by a bracket 96. Pulleys 90, 92 are disposed above pulleys 84, 86 as can best be seen in Figures 2 and 3.

A cable 100 extends from a power-operated winch, or other power means 101 normally utilized on commercial fishing vessels to pulleys 92 and 86, then engages the drive member 78, and proceeds upwardly through pulleys 84 and 90 to return to the power means 101 as best seen in Figure 1.

When actuated by cable 100 as above described, the invention is placed in the elevated position as shown in Figure 1, preferably by means of a closable hook 102, or other pivotal connection that engages the eye 34. Hook 102 is in turn supported by a cable 104 which depends downwardly from a pulley 106 affixed to the boom O. By use of a winch 108, cable 104 can be adjusted to support the invention at the desired height.

To prevent binding of the net P with other components of the invention as it moves over the spool 50, the guides 38 and 40 are so formed as to effect smooth junctions with lips 10b and 12b extending inwardly from the circumferential edges of side plates 10 and 12 respectively. The inner surfaces of lips 10b and 12b are positioned as closely as possible to the outer circumferential edges of flanges 58 and 60 without coming into frictional contact therewith. The inner edges of lips 10b and 12b are in substantially the same plane as the exterior surfaces of flanges 58 and 60.

Side wall 12 preferably has a thickened upwardly disposed portion 110 in which an opening 112 is formed (see Fig. 3). In the event it is not desired to use a cable drive to power the invention, an electric motor, air motor, or like prime mover 114 may be mounted on portion 110, as shown in Fig. 13. The drive shaft 116 of motor 114 projects inwardly through opening 112. A drive sprocket 118 is mounted on shaft 116, and is adapted to engage teeth 80a of gear 80. When it is not desired to use a prime mover 114, the opening 112 is closed by an annular metal name plate 120, as shown in Figure 2. The above described assembly is held together as an integral unit by nuts 122 and 122' which engage the threaded ends 44a and 44b of shaft 44.

The operation of the invention is extremely simple. After the purse seine P has been set, it is pursed by manually pulling in the lead line C and coiling same on the deck of the vessel B. Cable 104 is manipulated to dispose the invention either on the deck or suspended sufficiently close thereto as to permit the innermost portion of the seine P to be strung over the spool 50.

At this point the invention is then raised by means of cable 104 (Figure 1) in which the outer end of the boom O, as well as the invention are in an elevated position over substantially the center of the turntable T. When the invention is so disposed, a portion of the purse seine drapes downwardly in a substantially vertical position relative to the turntable T. Due to the ease with which even the longest nets can be handled by means of the present invention, it may be desirable in some instances to dispense with the turntable and stack the net directly on the deck of the vessel B.

Prime mover 101 is then actuated to cause movement of the cable 100, resulting in rotation of the cable drive member 78 and drum or spool 50. Due to its engagement with drive member 78 at a wedging angle, the cable 100 will not slip relative thereto, irrespective of whether the cable is wet or dry.

Spool 50 frictionally engages that portion of net P coming into contact therewith. Due to the pivotal support of the invention and this frictional engagement of the net, the invention tends to pivot outwardly toward the net being drawn in. The pivotal mounting of the invention also lends a tendency to the invention to move toward a position where the ribs 10a and 12a are parallel to the position of that section of the net being lifted out of the sea. It will be apparent that the closer the ribs 10a and 12a approach such a position, the greater the circumferential area will be of the flanges 58, 60 and web 56 in frictional contact with the net P, and the less the per unit stress to which the net is subjected by such frictional contact. As spool 50 rotates, the lead line C is pulled upwardly from the deck of vessel B and the seine P and cork line K are hauled inwardly thereto from the sea to concurrently pass over the spool. The lead line C, seine P and cork line K are directed inwardly by guides 38 and 40 to form a compact mass which is generally triangular in transverse section as would be defined by the member 50 as shown in Figure 3, which mass acts as an integral unit and is better able to withstand the stresses created during withdrawal of the net from the water toward the boat B than the same amount of net when expanded and the same stress is unevenly applied to the cords or fibers forming same.

As the net descends after passing through the invention, it can be easily stacked by one or two men to form folds of the desired configuration. Should a torn or damaged section of net be discovered as the net P is lowered from the invention, this section of net may simply be pulled to one side of the stacked net to permit repair thereof in the future. It will be apparent from an inspection of the invention as shown in Figures 2 and 3, that foreign material such as small fish, pieces of net, and the like, cannot enter the confines of the invention due to the close fit of guides 38 and 40 and lips 10b and 12b to the spool 50.

When it is desired to move yoke 20 relative to the balance of the invention, pin 30 is simply removed from its normal locking position, and the yoke pivoted on pin 18 to a position such as shown in Figure 4. When the device is actuated by a prime mover 114 it operates in the same manner as above described. Openings 120 are preferably formed in side plates 10 and 12, and can be of any desired shape inasmuch as their only function is to serve to lighten the unit.

Although the power block herein shown and described and the method of using same are fully capable of achieving the objects and providing the advantages hereinbefore described, it is to be understood that they are merely the presently preferred embodiments of my invention and that I do not man to be limited to the details of construction with respect to the foregoing description other than as defined in the appended claims.

The invention claimed is:

1. An apparatus for use in raising a fish net from an expanded fish-catching position to an elevated position above the deck of a boat from where it is subsequently lowered as a moving column that can be stacked in a desired configuration on said deck, including: a shaft; two vertical, laterally spaced, side members that support said shaft in a horizontal position therebetween; a spool rotatably supported on said shaft and having two opposite outwardly tapering annular flanges, said taper of said flanges being such that said net is compacted when passing therebetween to a degree that said net frictionally engages the surface of said flanges and can be raised to said elevated position; power means that rotate said pool; guide means mounted on said side members that initiate said net compaction; and support means affixed to at least one of said side members that permits said apparatus to be maintained at said elevated position.

2. An apparatus as defined in claim 1 in which said support means is an inverted yoke.

3. An apparatus as defined in claim 2 in which a first depending end portion of said yoke is pivotally connected to the first of said side members and a second depending end portion of said yoke is provided with locking means that permits said second end portion to be removably affixed to the second of said side members.

4. An apparatus as defined in claim 2 in which said guide means are two downwardly and outwardly extending rigid members affixed to said side members and disposed adjacent the upper portion of said spool.

5. An apparatus as defined in claim 4 in which said rigid members are of inverted crescent shape.

6. An apparatus as defined in claim 4 in which said spool includes two annular rigid plates affixed to the outer circumferential edge portions of said flanges, with said plates having centrally disposed aligned hubs that are rotatably supported on said shaft.

7. An apparatus as defined in claim 4 in which said power means is a prime mover and sprocket mounted on one of said side members, said plate adjacent said side member being provided with a gear wheel that is rigidly affixed thereto, and said gear wheel engaged and driven by said sprocket.

8. An apparatus as defined in claim 4 in which said power means is a power-driven cable and said yoke is provided with a plurality of pulleys that guide said cable to a sheave that is provided for and rigidly mounted on one of said plates.

References Cited in the file of this patent

UNITED STATES PATENTS

| | | |
|---|---|---|
| 785,139 | Wilhelmi | Mar. 21, 1905 |
| 1,353,370 | Williams | Sept. 21, 1920 |
| 2,344,132 | Coxe | Mar. 14, 1944 |
| 2,349,873 | Lisy | May 30, 1944 |
| 2,499,224 | Lutz | Feb. 18, 1950 |
| 2,654,570 | Voda | Oct. 6, 1953 |